United States Patent

Innings et al.

[11] Patent Number: 6,073,579
[45] Date of Patent: Jun. 13, 2000

[54] METHOD OF SUPERVISING THE FUNCTION OF A MILKING MACHINE, AND A MILKING MACHINE

[75] Inventors: Lars Innings, Huddinge; Ole Lind, Tumba; Benny Ornerfors, Jarfalla; Gunter Schlaiss, Tumba, all of Sweden

[73] Assignee: Alfa Laval Agri AB, Tumba, Sweden

[21] Appl. No.: 08/952,223

[22] PCT Filed: May 14, 1996

[86] PCT No.: PCT/SE96/00629

§ 371 Date: Jan. 30, 1998

§ 102(e) Date: Jan. 30, 1998

[87] PCT Pub. No.: WO96/36212

PCT Pub. Date: Nov. 21, 1996

[30] Foreign Application Priority Data

May 17, 1997 [SE] Sweden .................................. 9501835

[51] Int. Cl.[7] .................................................. A01J 5/007
[52] U.S. Cl. ........................................................ 119/14.02
[58] Field of Search ............................. 119/14.02, 14.14, 119/14.18, 14.47, 14.48, 14.49, 14.5, 14.51, 14.52, 14.53

[56] References Cited

U.S. PATENT DOCUMENTS

| 4,344,385 | 8/1982 | Swanson ............................... 119/14.08 |
| 4,941,433 | 7/1990 | Hanauer ................................ 119/14.02 |
| 5,054,425 | 10/1991 | Grimm et al. . |
| 5,218,924 | 6/1993 | Thompson ........................... 119/14.02 |
| 5,245,947 | 9/1993 | Oosterling et al. .................. 119/14.48 |
| 5,651,329 | 7/1997 | Van Den Berg et al. ............ 119/14.02 |

FOREIGN PATENT DOCUMENTS

| 0032752 | 1/1981 | European Pat. Off. . |
| WO9314625 | 8/1993 | United Kingdom . |

*Primary Examiner*—Thomas Price
*Attorney, Agent, or Firm*—Hovey, Williams, Timmons & Collins

[57] ABSTRACT

In a milking machine having a teatcup (3) with a teatcup liner (6) and a pulsation chamber (7), the abrupt movement of the teatcup liner (6) when the teatcup liner moves to an open or closed position is sensed. If the sensed movement does not fulfill a predetermined condition, a malfunction is signaled.

14 Claims, 2 Drawing Sheets

METHOD OF SUPERVISING THE FUNCTION OF A MILKING MACHINE, AND A MILKING MACHINE

BACKGROUND OF THE INVENTION

1. Field of the Invention

The present invention relates to a method of supervising the function of a milking machine having a teatcup with a teatcup liner and a pulsation chamber, comprising applying a milking vacuum to the interior of the teatcup liner and a pulsating vacuum to the pulsation chamber so that the teatcup liner cyclically moves between a substantially open position and a substantially closed position. Moreover the present invention relates to a milking machine comprising a teatcup with a teatcup liner and a pulsation chamber, a vacuum source for generating a milking vacuum in the interior of the teatcup liner and a pulsator provided to alternately connect the pulsation chamber to the atmosphere and to said vacuum source for generating a pulsating vacuum in the pulsation chamber to produce a pulsating movement of the teatcup liner between a substantially open position and a substantially closed position

2. Description of the Prior Art

Traditionally a milking machine comprises a cluster having a claw and four teatcups, each teatcup having a shell and a teatcup liner provided in the shell to form a pulsation chamber between the teatcup liner and the shell. During milking the interior of the teatcup liner is subjected to a milking vacuum, that is a low pressure of normally about 50 kPa under atmospheric pressure. There are also milking machines working under high pressure conditions, whereby the low pressure might be above atmospheric pressure. The pulsation chamber is subjected to a cyclically pulsating vacuum normally varying between atmospheric pressure, when the teatcup liner is collapsed or closed, and maximum vacuum level when the teatcup liner is fully open. The maximum pulsating vacuum level is normally a low pressure level of 50 kPa under atmospheric pressure, i.e. equal to the milking vacuum level. This means that the pressure difference across the wall of the teatcup liner is essentially equal to zero when the teatcup liner is fully open.

The pulsating vacuum demonstrates a pulsation cycle which may be divided into four phases, i.e. (a) an opening phase during which the pulsating vacuum increases from atmospheric pressure to normally about the milking vacuum level and the teatcup liner moves from a closed position to an open position, (b) an open phase during which the pulsating vacuum has reached its maximum level and is essentially equal to the milking vacuum level and the teatcup liner is in an open position, (c) a closing phase during which the pulsating vacuum decreases from about the milking vacuum level to the atmospheric pressure and the teatcup liner moves from the open position to the closed position, and finally (d) a closed phase during which the pulsating vacuum is equal to the atmospheric pressure and the teatcup liner is in a closed position. The opening and closing of the teatcup liner during phase (a) and (c), respectively, comprises a very fast and abrupt movement of the teatcup liner. From a closed position, i.e. opposite wall portions of the teatcup liner touch each other, as the pulsating vacuum increases the teatcup liner remains essentially closed until it at a certain pulsating vacuum level, the so called TPD (touch pressure difference), starts to open abruptly to the so called CCPD (critical collapse pressure difference), at which pulsating vacuum level the teatcup liner is fully open, i.e. said opposite wall portions of the teatcup liner are spaced apart from each other. From the point of time when the pulsating vacuum exceeds the TPD-level the teatcup liner thus is essentially open and a further increase of the pulsating vacuum only results in an insignificant further opening of the teatcup liner. This very abrupt opening and closing is an important feature of the teatcup liner which ensure an effective massaging of the teat during milking.

However when the teatcup liners get older they soften and their elasticity or resiliency gradually diminish resulting in a less gentle teat treatment and less effective massaging of the teat. In the end this means that the productivity of the milking process decreases and that the teatcup liner has to be replaced by a new one.

Up to now the point of time for such a replacement has been chosen in accordance with a more or less fixed predetermined scheme, or by a manual check performed by the operator of the milking machine.

However, individual teatcup liners age differently, which means that one teatcup liner might require replacement after a relatively short period of time, or a relatively low number of milkings, while another one might function satisfactorily for a significantly longer period of time. In view thereof, a fixed scheme for replacement is of course not an optimal instrument, because it means that on one hand still well functioning teatcup liners might be replaced and that on the other hand milking might be performed by means of more or less worn-out teatcup liners. Moreover a manual check of the teatcup liners is time-consuming and not very reliable.

WO-A-9 314 625 discloses a milking apparatus including, for each claw a pulsator and a control unit responsive to the opening and closing of the teatcup liners. The pulsation switching characteristics of the pulsator are controlled by the control unit in sympathy with the opening and closing of the teatup liners in order to improve the pulsation effectiveness, i.e. to ensure a fully collapsing and opening of the teatcup liners in a single pulsation cycle. When the teatcup liners are fully closed or open the airflow in the pulsating vacuum pipe ceases. This cessation of air flow is detected by different means proposed in WO-A-9 314 625. For example such means comprises a piston and a cylinder device provided in the pulsating vacuum pipe, whereby the piston moves with the air flow and comes to rest at two opposite positions at which positions the piston is detected to give a signal to the pulsator to change between atmospheric pressure and low pressure. Other proposed means are a device comprising a rubber diaphragm moving in response to the air flow, a rotating turbine device, and a hot wire galvanometer.

SUMMARY OF THE INVENTION

The object of the present invention is to overcome the disadvantages mentioned above and to provide a method and a device for automatically supervising the function of a milking machine. This object is obtained by the method initially defined which is characterized by the steps of: sensing the movement of the teatcup liner when the teatcup liner abruptly moves to one of said open and closed positions, and signalling a malfunction if said sensed movement does not fulfill a predetermined condition.

Since the teatcup liner after use loses in resiliency the pressure difference across the teatcup liner wall, which is necessary for producing the movement between the open and closed positions will decrease with time. This means that the TPD-level of the pulsating vacuum rises and that the teatcup liner will open later and close earlier. By sensing this movement directly or indirectly, for example by detecting the pulsating vacuum level when the movement occurs, the point of time when the movement occurs etc. and by signalling a malfunction when the movement does not fulfill a predetermined condition, one obtains a convenient supervision of the function of the teatcup liner. According to the proposed method the point of time for replacement of the teatcup liner may be determined more exactly than previously. Furthermore the proposed method renders all manual checks of the teatcup liners superfluous. Also when the teatcup liner is punctured or cracked this will be detected by the proposed method and replacement may be initiated immediately. Teatcup liners having a poor or insufficient quality from the very beginning, i.e. piracy copies, will be revealed and the milking farmer is given an indication that such teatcup liners preferably should be avoided in order to achieve an optimal function of the milking machine. Moreover by the method of claim 1 also the function of the pulsator will be supervised. E.g. if no pulsation occurs this will be detected since then no teatcup liner movement will take place. If the pulsator ratio is outside a predetermined range, this may be detected since then the teatcup liner movement will occur later or earlier. Disconnection or obstruction due to dirt, squeezing or bending of the short or long pulse tubes will be detected as well. Finally the function of the complete milking system may be supervised by the method of claim 1. E.g. divergance from a desired milking vacuum level, due to defects in the vacuum pump, the vacuum regulating means, leakage in milk line or tubes, obstructions due to dirt, squeezing or bending of the milk tubes, incorrectly adjusted valves, etc, may be detected since then the teatcup liner movement will occur at a different pulsating vacuum level, will occur later or earlier, or will not occur at all.

According to a first preferred embodiment said sensing step comprises detecting the value of a teatcup liner movement responsive variable when the teatcup liner abruptly moves to one of said open and closed positions, and said malfunction is signalled if the detected value is outside a predetermined range. Thereby the variable may be the pulsating vacuum in the pulsation chamber.

According to a second preferred embodiment said sensing step comprises detecting the point of time from the beginning of at least one of successive pulsation cycles when the teatcup liner abruptly moves to one of said open or closed positions, and said malfunction is signalled if the detected point of time is outside a predetermined interval. Said point of time may be detected in response to a teatcup liner movement responsive variable. Thereby the variable preferably may be the pulsating vacuum in the pulsating chamber or the volume in the pulsation chamber. Moreover the teatcup comprises a shell enclosing the teatcup liner, the pulsation chamber being defined between the teatcup liner and the shell, and hence the variable may be the distance between a point fixed relative to the shell and the teatcup liner.

The object of the present invention is also obtained by the milking machine initially defined which is characterized by a sensor provided for sensing the movement of the teatcup liner when the teatcup liner abruptly moves to one of said open and closed positions, and an electronic processing unit adapted to signal a malfunction in response to said sensor sensing a movement of the teatcup liner which does not fulfill a predetermined condition.

By means of such a milking machine the functioning of the machine may be automatically supervised. Thereby defects in the system may be detected and an appropriate point of time for replacement of the teatcup liner may be determined.

The dependent claims 9 to 14 define preferred embodiments of the milking machine.

BRIEF DESCRIPTION OF THE DRAWINGS

Embodiments of the present invention will now be described in more detail with reference to the accompanying drawings, in which.

DESCRIPTION OF VARIOUS EMBODIMENTS OF THE PRESENT INVENTION

Figure 1:
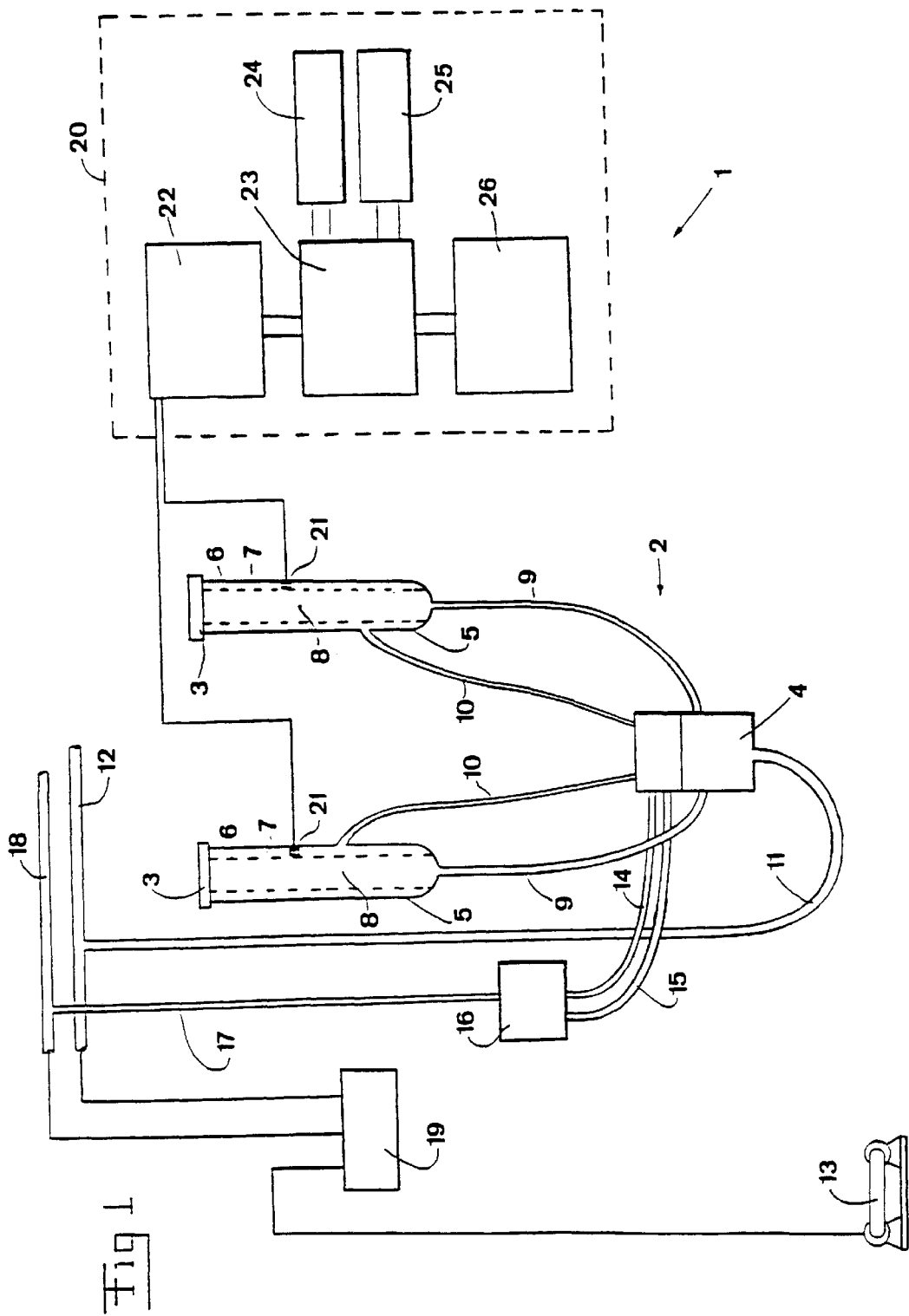
FIG. 1 shows a schematical view of some components of a milking machine in accordance with the invention.

FIG. 1 shows a milking machine 1 which comprises a cluster 2 including at least one teatcup 3, and a claw 4. In the disclosed embodiment two teatcups 3 are provided, although it may be more teatcups, e.g. four, depending on the animal to be milked. Each teatcup 3 comprises a shell 5 and a teatcup liner 6. A pulsation chamber 7 is formed between the shell 5 and the teatcup liner 6. The interior of each teatcup liner 6 forms a milk conducting passage 8. The claw 4 is connected to the milk conducting passages 8 by short milk tubes 9, and to the pulsation chambers 7 by short pulse tubes 10. The short milk tubes 9 are via the claw 4 connected to a long milk tube 11 extending from the claw 4 to a milk line 12 which communicates with a vacuum pump 13. The short pulse tubes 10 are via the claw 4 connected in pairs to long pulse tubes 14, 15 which in turn are connected to a pulsator 16. The pulsator 16 is connected by one long pulse tube 17 to a pulsator air line 18 which communicates with the vacuum pump 13. Alternatively the long pulse tube 17 may be omitted and the pulsator 16 may be provided directly on the pulsator air line 18. A pressure regulating device 19 is provided between the vacuum pump 13 and the pulsator air line 18 and the milk line 12 in order to separately regulate the vacuum level to the pulsator air line 18 and to the milk line 12. An electronic processing unit 20 is connected to a sensor 21 provided to sense the movement of the teatcup liner 6. Although the sensor may be of different types, as will be explained below, this embodiment makes use of a pressure sensor 21 provided in at least one of the pulsation chambers 7 for sensing the pulsating vacuum. It should be noted that the pressure sensor 21 also may be provided in one of the short pulse tubes 10, the long pulse tubes 14, 15, the pulsator 16 and the claw 4.

The electronic processing unit 20 comprises different means which are illustrated as different functional blocks. It should be noted however that these functions may be performed by means of one or more microprocessors. The functional blocks are a recording means 22 connected to the sensor 21 for recording the sensed values of the pulsating vacuum, a processing means 23 connected to the recording means 22 for processing the recorded values, a detecting means 24 communicating with the processing means 23 to detect deviations, a comparing means 25 communicating with the processing means 23 to compare the detected value with a predetermined condition, and a signalling means 26 to signal a malfunction.

Figure 2:
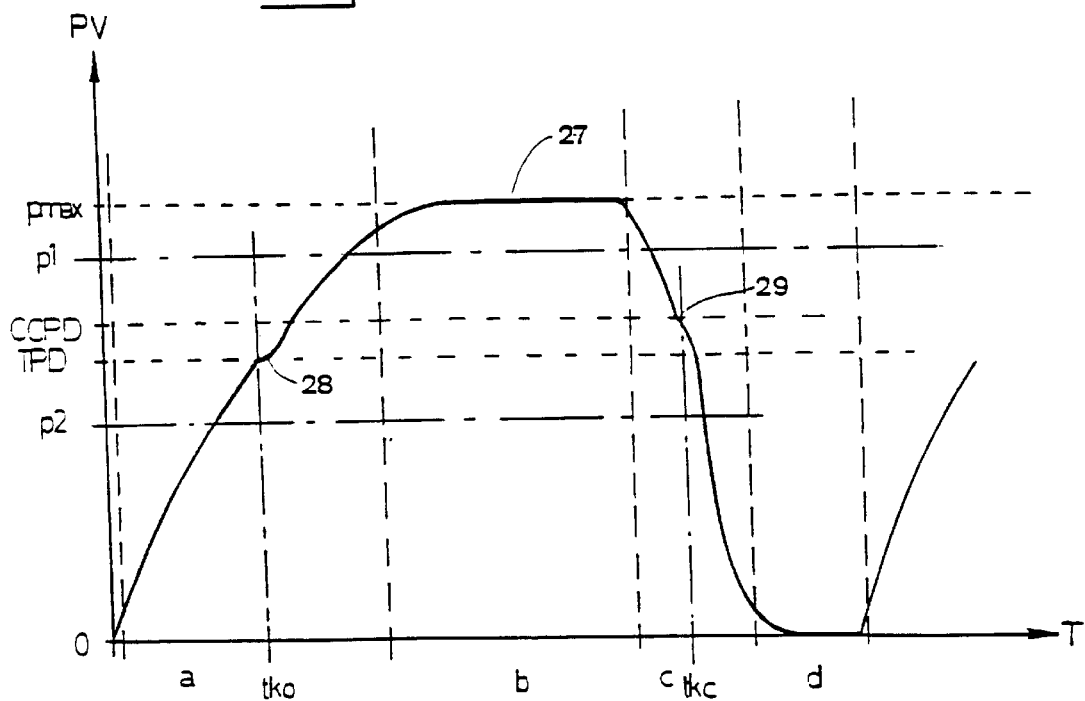
FIG. 2 is a diagram illustrating the change of the pulsating vacuum during a pulsation cycle when the milking machine according to the invention is operated.

FIG. 2 shows a curve 27 of the pulsating vacuum PV in the pulsation chamber 7 as a function of time T during one pulsation cycle when the teatcup 3 is applied to the teat of an animal. Alternatively such curve may be provided by applying the teatcup 3 to an artificial teat or by closing off the teatcup liner. The pulsating vacuum increases from zero (which corresponds to atmospheric pressure) during a phase (a) to a maximum pulsating vacuum level pmax of about 50 kPa. During a phase (b) the pulsating vacuum remains at the maximum level pmax and during a phase (c) it drops back to zero and remains at zero during phase (d). During the phase (a) the teatcup liner 6 is closed until the pulsating vacuum has reached the touch pressure difference, TPD, at which pulsating vacuum level the teatcup liner 6 suddenly and abruptly opens. Due to this opening movement of the teatcup liner 6 the volume of the pulsation chamber 7 decreases. This volume decrease results in a temporary interruption of the increase of the pulsating vacuum in the pulsation chamber 7, which gives rise to a distinct irregularity at a portion 28 of the curve 27 during phase (a), see the diagram of FIG. 2. By means of the pressure sensor 21 and the electronic processing unit 20 it is possible to detect the pulsating vacuum level at the portion 28, which level corresponds to the touch pressure difference, TPD. The detected pulsating vacuum level is compared by the comparing means 25 with a predetermined range p1 to p2, and when the detected value is outside this range p1 to p2, a signal is generated by the signalling means 26. The signalling means 26 may be for example a display showing a written message requesting replacement of the teatcup liner. Alternatively it may be a twinkling lamp, a siren etc.

After being in use for a certain period of time the teatcup liner 6 softens and the touch pressure difference, TPD, rises, see the diagram of FIG. 2, i.e. the necessary pressure difference across the teatcup liner wall for causing closing and opening, respectively decreases. Typically this pressure difference is about 10–12 kPa for a new teatcup liner 6. This means that the pulsating vacuum at TPD will be about 38 to 40 kPa and the predetermined range p1 to p2 will for example be from about 33 to 45 kPa. By such a range the teatcup liners 6 will be detected and replaced when they have lost so much resiliency that the pressure difference across the wall is less than 5 kPa.

It should be pointed out that the abrupt movement of the teatcup liner 6 also may be detected during phase (c) when the pulsating vacuum decreases and the teatcup liner 6 closes at the critical collapse pressure difference, CCPD. During phase (c) there is a sudden volume increase of the pulsation chamber 7 which is indicated as a distinct irregularity at a portion 29 of the curve 27 in the diagram of FIG. 2.

Each milking may be divided into four periods, i.e. the initial stimulation or passage period, the main flow period, the flow decreasing period, and the flow terminating period. During the initial, flow decreasing and flow terminating period the milk flow is reduced in comparison with the main flow period. The milking vacuum level will vary with the milk flow such that a high milk flow reduces the milking vacuum level in the interior 8 of the teatcup liner 6. Therefore it is important to determine the TPD-level and CCPD-level, resp., under the same conditions of each milking in order to get a comparable value. Although it appears from FIG. 2 that the CCPD-level is the same during phase (a) and (c) and that the TPD-level is the same during phase (a) and (c), it should be noted that this must not be the case.

The TPD-level or CCPD-level may be detected in various ways. One possibility is offered by sensing a variable which is responsive to the movement of the teatcup liner and by detecting the pulsating vacuum level when the sensed variable indicates said abrupt opening or closing of the teatcup liner 6. E.g. this variable may be recording the increase rate and the decrease rate, respectively, of the pulsating vacuum, whereby the pulsating vacuum level may be detected when this rate is temporarily reduced.

By the recording means 22 the pulsating vacuum may be recorded as a function of time as the pulsating vacuum increases or decreases during a pulsation cycle. The derivative of this recorded function may be determined by the processing means 23. Since the inclination of the curve 27 is abruptly changed at the portions 28 and 29 the derivative will correspondingly change at these portions 27, 29, which may be detected by the detecting means 24.

It is also possible to record the pulsating vacuum over time by the recording means 22 as the pulsating vacuum increases or decreases during a pulsation cycle during which the interior of the teatcup liner is exposed to the atmospheric pressure. This may be done as an initial measure before the actual milking process has started and during such a pulsating vacuum increase or decrease the teatcup liner 6 will be fully open. Thereafter a pulsating vacuum/time function based on the recorded pulsating vacuum may be evaluated by the processing means 23. The pulsating vacuum level during a subsequent pulsation cycle of the milking process when the increase or decrease of the pulsating vacuum deviates a predetermined value from the pulsating vacuum/time function may be detected by the detecting means 24.

Moreover it is possible to record the change of the pulsating vacuum over time by the recording means 22 as the pulsating vacuum increases or decreases during a pulsation cycle. Thereafter a pulsating vacuum/time function based on the recorded pulsating vacuum and on the prerequisite that the volume of the pulsation chamber is kept constant may be evaluated by the processing means 23. The pulsating vacuum during a subsequent pulsation cycle of the milking process may be sensed by the sensor 21, and when the sensed pulsating vacuum deviates a predetermined value from the evaluated pulsating vacuum/time function this may be detected by the detecting means 24.

Furthermore it is also possible to record the pulsating vacuum over time during the increase or decrease of the pulsating vacuum during one pulsation cycle by the recording means 22 and to have the processing means 23 to evaluate an extrapolated mathematical function by means of a few initial values of the recorded pulsating vacuum. Thereafter the detecting means 24 may detect the pulsating vacuum level when the increase or decrease of the pulsating vacuum deviates a predetermined value from the extrapolated mathematical function.

Figure 3:
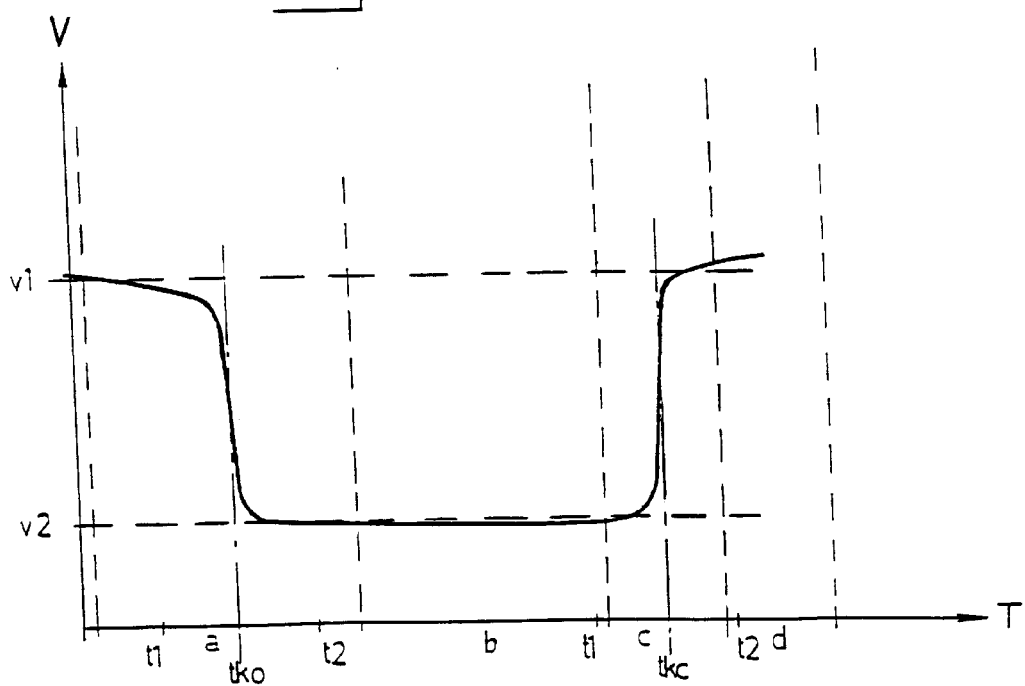
FIG. 3 is a diagram illustrating the change of the volume of the pulsation chamber during a pulsation cycle when the milking machine according to the invention is operated.

As mentioned above the abrupt movement of the teatcup liner 6 results in a rapid volume change of the pulsation chamber 7. During phase (a) the pulsating vacuum initially increases while the volume of the pulsating chamber 7 essentially remains the same. When the pulsating vacuum reaches the touch pressure difference, TPD, the teatcup liner 6 opens and the volume of the pulsating chamber 7 suddenly decreases. Thus in a volume time-V-T diagram, see FIG. 3, the volume v1 of the pulsation chamber 7 during the beginning of phase (a) is essentially constant. At the TPD-level, i.e. at the opening moment tko of the teatcup liner 6, the volume decreases rapidly, is essentially constant v2 during phase (b) and increases rapidly to the volume v1 at the closing moment tkc of the teatcup liner 6 during the decrease of the pulsating vacuum.

Such a volume change may be detected by different types of sensors 21. For example a flow meter 21 measuring the air flow in or to and from the pulsation chamber 7 may be provided. Thus during the opening and closing movements there will be a sudden air flow and between the opening and closing movements the air flow is essentially stopped.

The volume change may also be detected by a distance measuring device 21, sensing the distance between a point, fixed relative to the shell 5, and the teatcup liner 6. Such a sensor may be a distance measuring device 21 using infrared light and attached to the inner wall of the shell 5.

In order to obtain a comparable value, the point of time tk when this sudden volume change occurs is detected and recorded. When the teatcup liner 6 becomes softer and less resilient the abrupt opening and closing movements occur later, and earlier, respectively, i.e. when the pressure difference across the teatcup liner wall is smaller, due to decreasing inherent spring forces of the teatcup liner 6. By comparing the point of time tko and tkc for the opening and closing, respectively, of the teatcup liner 6 with a predetermined time interval t1 and t2, it is possible to detect when the opening or closing of the teatcup liner 6 occurs too late and too early, respectively, and thus that the quality of the teatcup liner 6 is unacceptable.

Such a deviation in time may be detected by means of the electronic processing unit 20 provided that the processing means 23 comprises a time measuring means, such that the point of time for the opening and closing, respectively, of the teatcup liner 6 may be determined and recorded.

It should be pointed out that it is also possible to determine the point of time when the increase rate or decrease rate of the pulsating vacuum is temporarily reduced and to compare this point of time with a predetermined time interval.

By means of the disclosed equipment it is possible to supervise each teatcup liner 6 of a milking machine 1 individually by the provision of a pressure sensor 21, a volume sensor 21, etc. for each teatcup liner 6.

The present invention may be applied to fully automatic milking and to milking requiring manual attachment of the teatcups. The supervision according to the present invention may be performed during real milking or e.g. as an initial measure on an artificial teat. The disclosed method and milking machine are suitable for milking of animals such as cows, sheep, goats and buffalos.

We claim:

1. A method of supervising the function of a milking machine having a teatcup with a teatcup liner and a pulsation chamber, comprising applying a milking vacuum to the interior of the teatcup liner and a pulsating vacuum to the pulsation chamber so that the teatcup liner cyclically moves between a substantially open position and a substantially closed position, including the steps of:
   sensing the movement of the teatcup liner when the teatcup liner abruptly moves to one of said open and closed positions, and
   signalling a malfunction if said sensed movement does not fulfill a predetermined condition.

2. A method according to claim 1, wherein said sensing step comprises detecting the value of a teatcup liner movement responsive variable when the teatcup liner abruptly moves to one of said open and closed positions, and the malfunction is signalled if the detected value is outside a predetermined range.

3. A method according to claim 2 wherein the variable is the pulsating vacuum in the pulsation chamber.

4. A method according to claim 1, wherein said sensing step comprises detecting the point of time from the beginning of at least one of successive pulsation cycles when the teatcup liner abruptly moves to one of said open and closed positions, and the malfunction is signalled if the detected point of time is outside a predetermined interval.

5. A method according to claim 4, wherein said point of time is detected in response to the value of a teatcup liner movement responsive variable, when the teatcup liner abruptly moves to one of said open and closed positions.

6. A method according to claim 4, wherein the variable is the volume of the pulsation chamber.

7. A method according to claim 4, wherein the teatcup comprises a shell enclosing the teatcup liner, the pulsation chamber being defined between the teatcup liner and the shell and that the variable is the distance between a point fixed relative to the shell and the teatcup liner.

8. A milking machine comprising a teatcup with a teatcup liner and a pulsation chamber, a vacuum source for generating a milking vacuum in the interior of the teatcup liner and a pulsator provided to alternately connect the pulsation chamber to the atmosphere and to said vacuum source for generating a pulsating vacuum in the pulsation chamber to produce a pulsating movement of the teatcup liner between a substantially open position and a substantially closed position, including
   a sensor provided for sensing the movement of the teatcup liner when the teatcup liner abruptly moves to one of said open and closed positions, and
   an electronic processing unit adapted to signal a malfunction in response to said sensor sensing a movement of the teatcup liner which does not fulfill a predetermined condition.

9. A milking machine according to claim 8, wherein that the electronic processing unit comprises detecting means to detect the value of a teatcup liner movement responsive variable when the teatcup liner abruptly moves to one of said open and closed positions, a comparing means to compare the detected value with a predetermined range and a signaling means provided to give a signal when the detected value is outside the predetermined range.

10. A milking machine according to claim 8, wherein that the electronic processing unit comprises detecting means to detect the point of time from the beginning of at least one of successive pulsation cycles when the teatcup liner abruptly moves to one of said open and closed positions, a comparing means to compare the detected point of time with a predetermined interval and a signaling means provided to give a signal when the detection point of time is outside the predetermined interval.

11. A milking machine according to claim 10, wherein that the electronic processing unit comprises recording means connected to the sensor and provided to record the value of a teatcup liner movement responsive variable when the teatcup liner abruptly moves to one of said open and closed positions and in that the detecting means is provided to detect the point of time in response to the recording means recording said value of said variable.

12. A milking means according to claim 8, wherein the sensor is a pressure sensor for sensing the pulsating vacuum in the pulsation chamber.

13. A milking machine according to claim 8, wherein the sensor is a flow meter for sensing the change of the volume of the pulsation chamber.

14. A milking machine according to claim 8, wherein the teatcup comprises a shell enclosing the teatcup liner, the pulsation chamber being defined between the shell and the teatcup liner and that the sensor is a distance measuring device for sensing the distance between a point fixed relative to the shell and the teatcup liner.

* * * * *